(12) United States Patent
Christenson et al.

(10) Patent No.: US 10,286,461 B2
(45) Date of Patent: May 14, 2019

(54) ADJUSTABLE SHIMABLE INDEXABLE SHEAR TIP

(71) Applicant: Exodus Machines, Inc., Superior, WI (US)

(72) Inventors: Ross Denny Christenson, Esko, MN (US); James Donald Campbell, Two Harbors, MN (US); Bruce Edward Bacon, Duluth, MN (US)

(73) Assignee: Exodus Machines Incorporated, Superior, WI (US)

( * ) Notice: Subject to any disclaimer, the term of this patent is extended or adjusted under 35 U.S.C. 154(b) by 194 days.

(21) Appl. No.: 15/234,539

(22) Filed: Aug. 11, 2016

(65) Prior Publication Data

US 2016/0348339 A1   Dec. 1, 2016

Related U.S. Application Data

(63) Continuation-in-part of application No. 14/261,611, filed on Apr. 25, 2014, now abandoned.

(51) Int. Cl.
*B23D 35/00* (2006.01)
*B23D 17/00* (2006.01)
(Continued)

(52) U.S. Cl.
CPC .......... *B23D 35/002* (2013.01); *B23D 17/00* (2013.01); *B23D 35/001* (2013.01); *E02F 3/965* (2013.01); *E02F 9/2883* (2013.01)

(58) Field of Classification Search
CPC .... B23D 17/00; B23D 35/00–002; B25F 3/00
(Continued)

(56) References Cited

U.S. PATENT DOCUMENTS 3,006,089 A   10/1961   Johnson
4,104,792 A    8/1978   LaBounty
(Continued)

FOREIGN PATENT DOCUMENTS

DE   29708705   8/1997
EP    0666131   8/1995
(Continued)

OTHER PUBLICATIONS

International Search Report and Written Opinion of PCTUS2015/026828 dated Jul. 24, 2015.

*Primary Examiner* — Jason Daniel Prone
(74) *Attorney, Agent, or Firm* — Briggs and Morgan, P.A.; Gerald E. Helget (57) ABSTRACT

An adjustable shimable indexable shear tip assembly for a distal end tang of a heavy duty demolition shear having a upper movable shear jaw with a tang that has side faces with apertures therethrough, a top seat, a rear seat and a bottom seat. The adjustable shimable shear tip assembly has a two-sided shear tip section with a sidewall and a bottom wall that is adapted to be seated on one of the side tang faces, the top seat, the rear seat and the bottom seat. The bottom wall is formed with the sidewall at a shear edge and is adapted to be seated on the tang bottom seat with a leading shear punching edge. A side plate is provided and adapted to be seated on the other tang side face, the top seat, the rear seat with another shear edge along the bottom wall. The side plate has apertures therethrough alignable with the sidewall apertures and the tang apertures to secure the sidewall, lower wall and access plate to the tang. An extending boss maybe on the lower inside face of the side plate as to index and interlock with a matching indexing slot on the distal face of the bottom wall. A shim may be used with the assembly.

6 Claims, 6 Drawing Sheets

(51) Int. Cl.
*E02F 3/96* (2006.01)
*E02F 9/28* (2006.01)

(58) Field of Classification Search
USPC ............................... 30/134, 228, 379, 379.5
See application file for complete search history.

(56) References Cited

U.S. PATENT DOCUMENTS

| | | |
|---|---|---|
| 4,188,721 A | 2/1980 | Ramun et al. |
| 4,198,747 A | 4/1980 | LaBounty |
| 4,403,431 A | 9/1983 | Ramun et al. |
| 4,543,719 A | 10/1985 | Pardoe |
| 4,558,515 A | 12/1985 | LaBounty |
| 4,776,093 A | 10/1988 | Gross |
| 4,897,921 A | 2/1990 | Ramun |
| 5,146,683 A | 9/1992 | Morikawa et al. |
| 5,187,868 A | 2/1993 | Hall |
| 5,339,525 A | 8/1994 | Morikawa |
| 5,531,007 A | 7/1996 | Labounty |
| 5,533,682 A | 7/1996 | de Gier et al. |
| 5,873,168 A | 2/1999 | Johnson et al. |
| 5,894,666 A | 4/1999 | Hrusch |
| 5,940,971 A | 8/1999 | Ramun |
| 5,992,023 A | 11/1999 | Sederberg et al. |
| 6,061,911 A | 5/2000 | LaBounty et al. |
| 6,119,970 A | 9/2000 | LaBounty et al. |
| 6,202,308 B1 | 3/2001 | Ramun |
| 6,655,054 B1 | 12/2003 | Ward |
| 6,839,969 B2 | 1/2005 | Jacobson et al. |
| 6,926,217 B1 | 8/2005 | LaBounty et al. |
| 7,216,575 B2 | 5/2007 | Alseth et al. |
| 7,284,718 B2 | 10/2007 | Christenson |
| 7,306,177 B2 | 12/2007 | Ward |
| 7,487,930 B2 | 2/2009 | Sederberg et al. |
| D602,509 S | 10/2009 | van Gemert |
| D622,297 S | 8/2010 | van Gemert |
| 7,895,755 B2 | 3/2011 | Jacobson et al. |
| 8,146,256 B2 | 4/2012 | Johnson et al. |
| 8,176,636 B2 | 5/2012 | Bush |
| D687,077 S | 7/2013 | Gerardus de Gier |
| D687,470 S | 8/2013 | Gerardus de Gier |
| 9,132,490 B2 | 9/2015 | Ramun |
| 9,333,570 B2 | 5/2016 | Clemons et al. |
| 2002/0011535 A1 | 1/2002 | Cook |
| 2004/0093739 A1 | 5/2004 | Jacobson et al. |
| 2006/0053630 A1* | 3/2006 | White ............... B23D 51/02 30/151 |
| 2007/0130776 A1 | 6/2007 | Grant et al. |
| 2008/0072434 A1 | 3/2008 | Clemons et al. |
| 2014/0317935 A1 | 10/2014 | Clemons |
| 2014/0319257 A1 | 10/2014 | Clemons |
| 2014/0331843 A1 | 11/2014 | Hall |
| 2015/0308075 A1 | 10/2015 | Christenson et al. |
| 2016/0001293 A1 | 1/2016 | Raihala |
| 2016/0059328 A1 | 3/2016 | Jacobson et al. |

FOREIGN PATENT DOCUMENTS

| | | |
|---|---|---|
| EP | 0768137 | 4/1997 |
| EP | 1939362 | 7/2008 |

\* cited by examiner

ADJUSTABLE SHIMABLE INDEXABLE SHEAR TIP

CROSS-REFERENCE TO RELATED APPLICATIONS

The present application is a continuation-in-part of U.S. Ser. No. 14/261,611, filed Apr. 24, 2014, now abandoned.

BACKGROUND OF THE INVENTION

The present invention relates to demolition equipment and more particularly to heavy duty demolition shears for reducing building and construction materials to scrap for recycling.

Demolition of buildings and steel structures has become important where space is needed to build new structures while the demolishment of such structures must be efficient and be able to reduce all materials to a small enough size for recycling and eventual reuse of metals once melted down and reformed. Burying of scrap materials is simply not even an option anymore. In fact, reprocessing of metal materials from demolition destined for scrap yards for recycling has become a huge business.

Demolition shears have become an important tool for demolition jobs. Bridges and large buildings have significant amounts of metal support, metal reinforced concrete and other metal reinforced structures. Such metal pieces are large and often have multiple connections. Cutting of these metals by saw, grinder or torch has become way too impractical, expensive and hazardous. Demotion shears are used to punch through metals and shear the metal structures into small pieces. In fact, metal demolition shears are used to cut metal cables, reinforced concrete, car parts, rods, rebar, rail cars, tanks, pipes, channels and other vehicle frames. Demolition shears can easily shear up to sixteen inch I-beams into small pieces that are only a couple of feet long or less and readily usable for recycling once reduced in size.

Demolition shears are typically mounted on the distal end of a boom structure or dipper stick on a backhoe or excavator. By this arrangement, the shear is actually mobile and capable of moving about a demolition site as well as reaching elevated positions up high in a safe manner. The operation of the shears with one movable and one fixed (or movable) jaw is by hydraulic cylinders.

Figures 1, 1A, 2, 3:
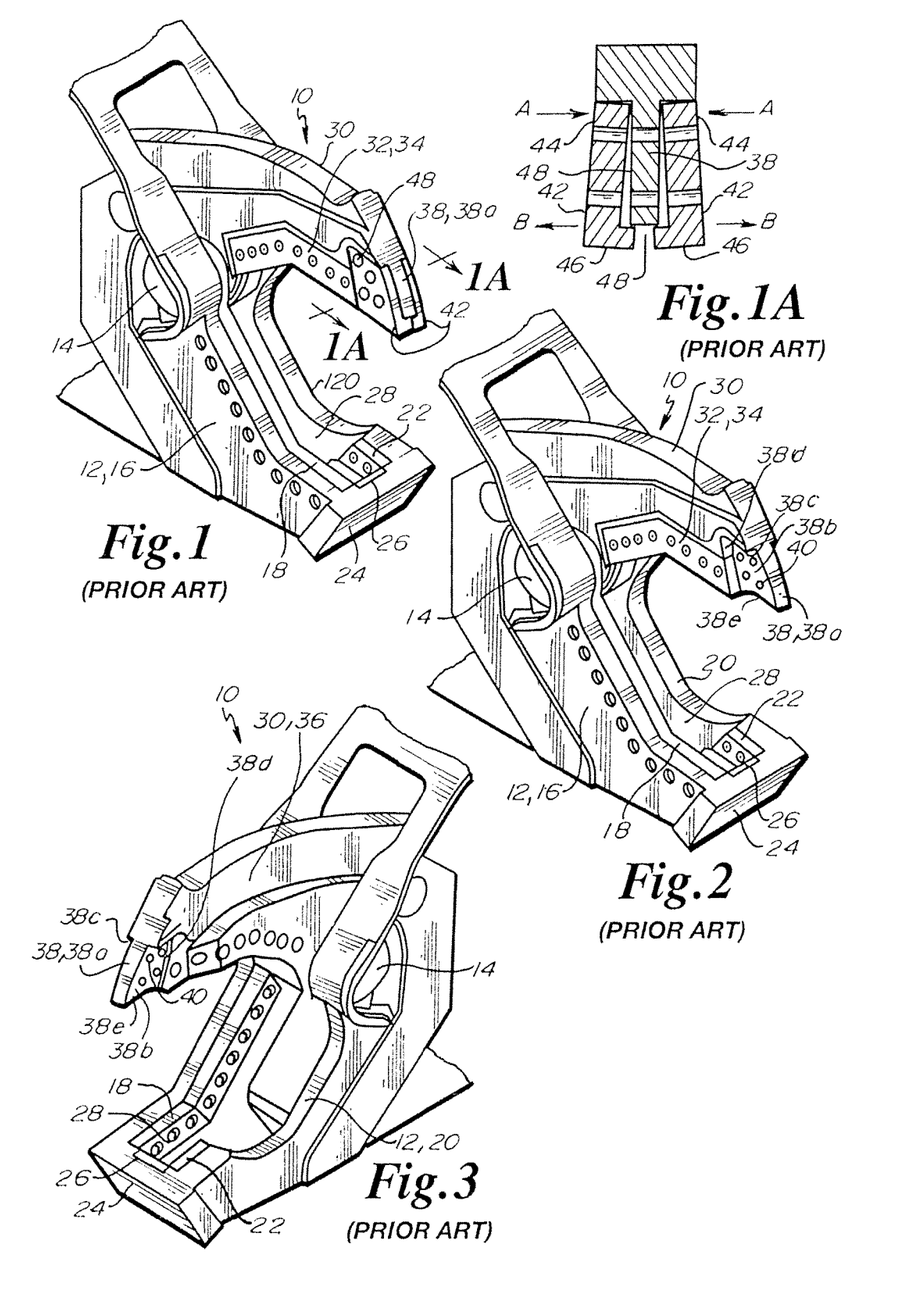
FIG. 1 is a shear blade side front perspective view of a prior art demolition shear with L-shaped shear tip sections.
FIG. 1A is a cross section view taken along lines 1A-1A of FIG. 1.
FIG. 2 is a shear blade side front perspective view of a prior art demolition shear with L-shaped shear tip sections removed showing the upper jaw tang.
FIG. 3 is a guide blade side front perspective view of a prior art demolition shear with L-shaped shear tip sections removed showing the upper jaw tang.
Figure 4:
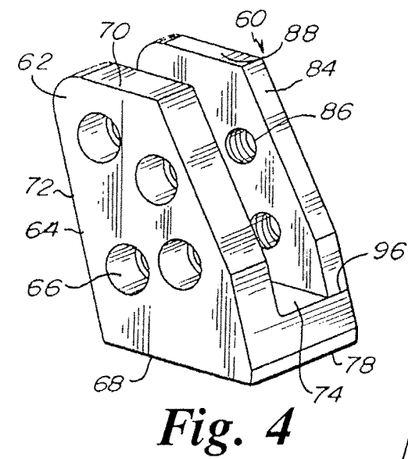
FIG. 4 is a front perspective view of the adjustable shear tip of the present invention.
Figure 5:
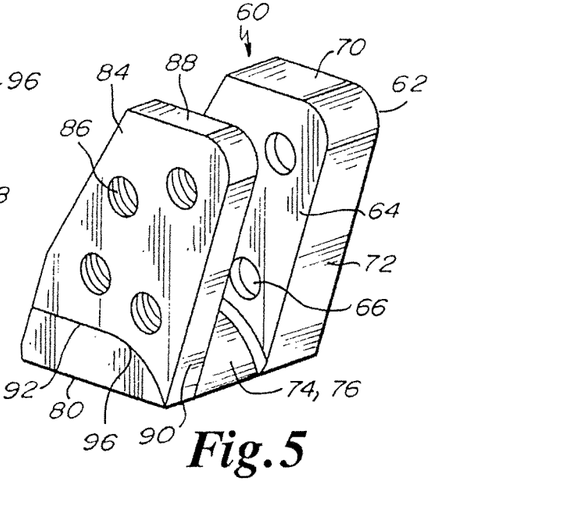
FIG. 5 is a rear perspective view of the adjustable shear tip of the present invention.
Figure 6:
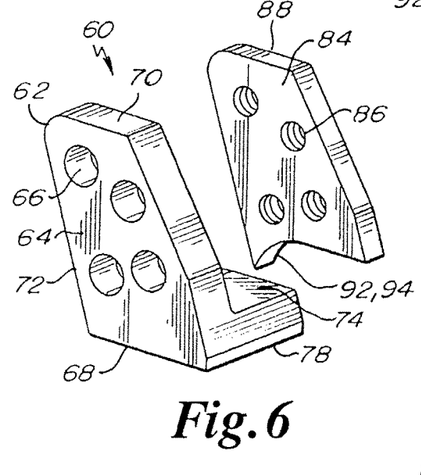
FIG. 6 is a front perspective exploded view of the adjustable shear tip of the present invention.
Figure 7:
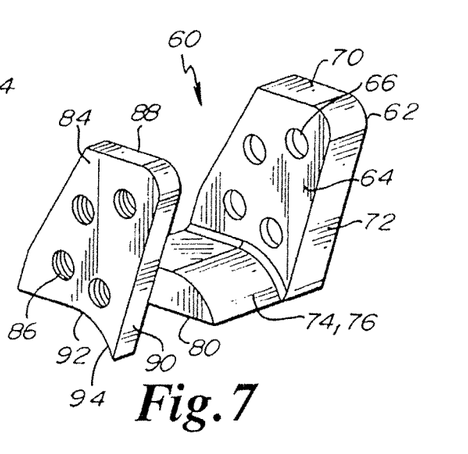
FIG. 7 is a rear perspective exploded view of the adjustable shear tip of the present invention.
Figure 8:
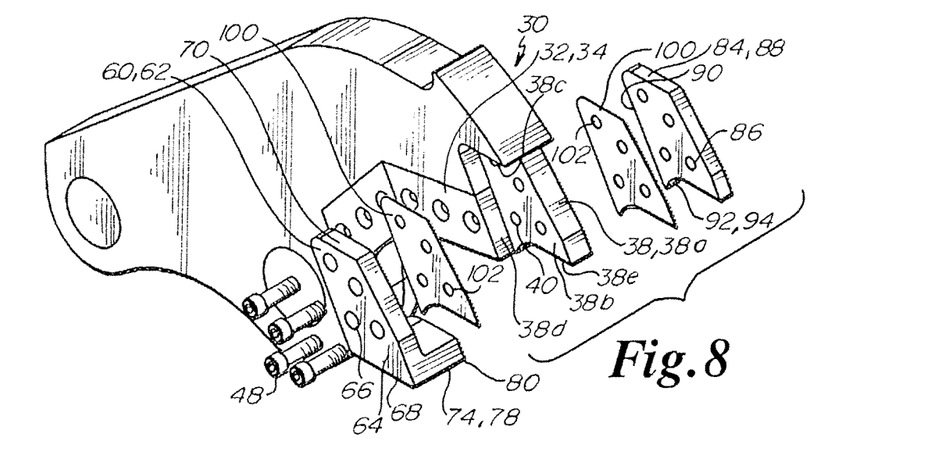
FIG. 8 is a front perspective shear side view of an upper jaw of a prior art demolition shear with the adjustable shear tip of the present invention in exploded view.
Figure 9:
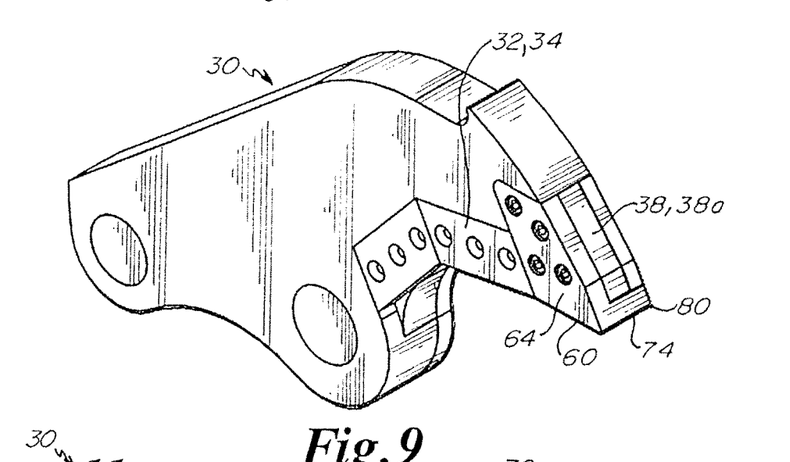
FIG. 9 is a front perspective shear side view of an upper jaw of a prior art demolition shear with the adjustable shear tip of the present invention installed thereon.
Figures 10, 11:
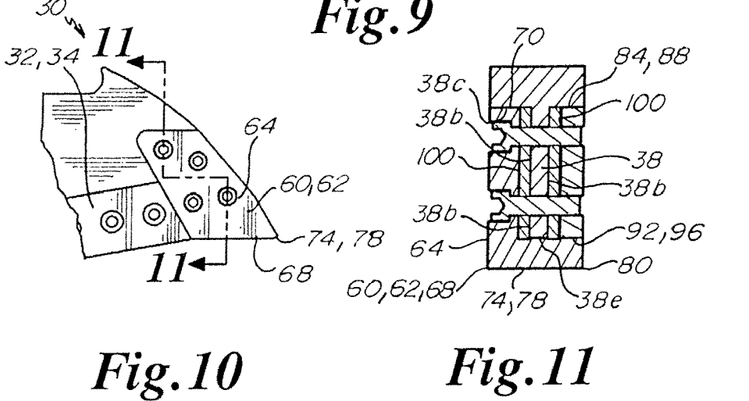
FIG. 10 is a broken away shear side elevational view of the distal end of the upper jaw with the present invention installed thereon.
FIG. 11 is a cross sectional view taken along lines 11-11 of FIG. 10.
Figure 12:
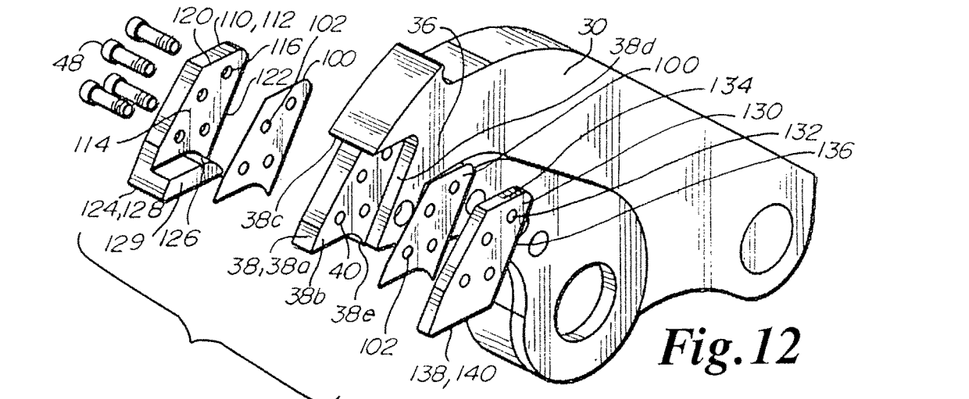
FIG. 12 is a front perspective guide side view of an upper jaw of a prior art demolition shear with a second embodiment of the adjustable shear tip of the present invention in exploded view.
Figure 13:
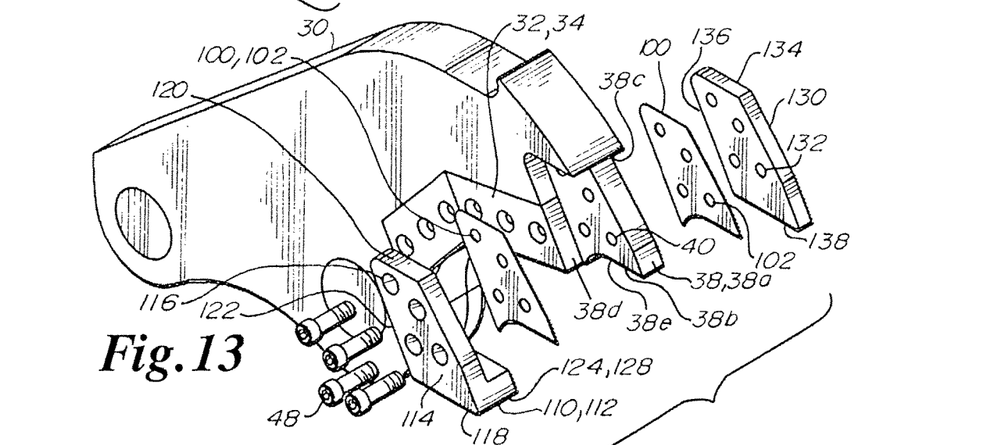
FIG. 13 is a front perspective shear side view of an upper jaw of a prior art demolition shear with a second embodiment of the adjustable shear tip of the present invention in exploded view.
Figure 14:
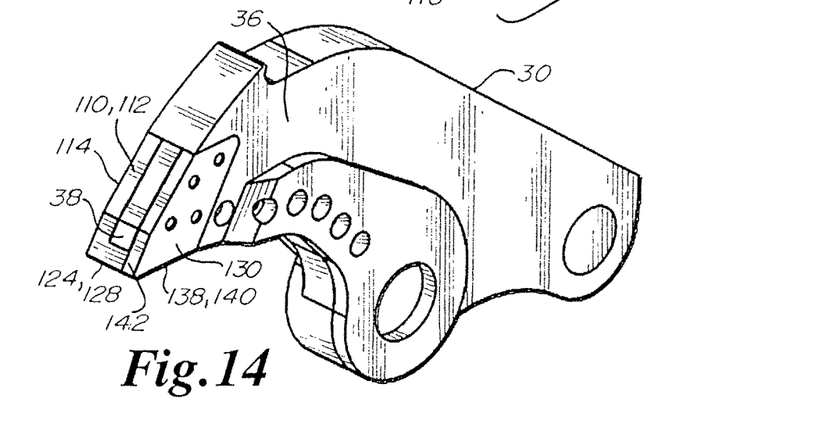
FIG. 14 is a front perspective guide side view of an upper jaw of a prior art demolition shear with a second embodiment of the adjustable shear tip of the present invention assembled thereon.
Figure 15:
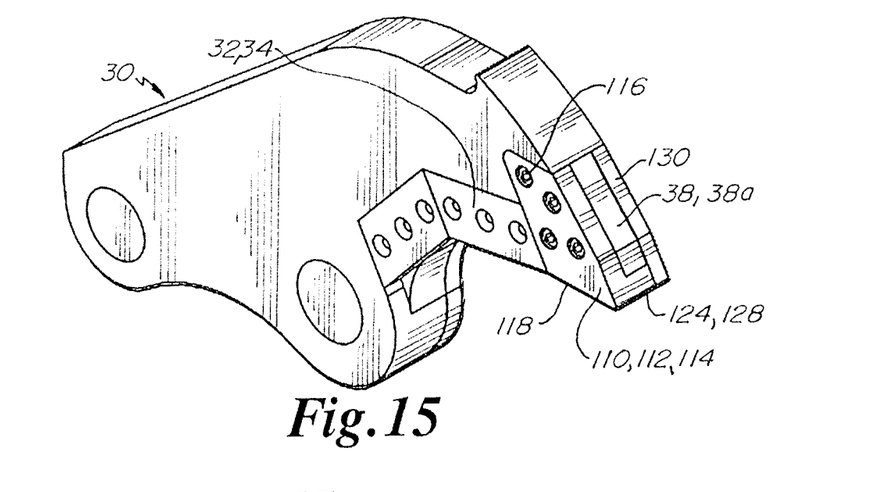
FIG. 15 is a front perspective shear side view of an upper jaw of a prior art demolition shear with a second embodiment of the adjustable shear tip of the present invention assembled thereon.
Figure 16:
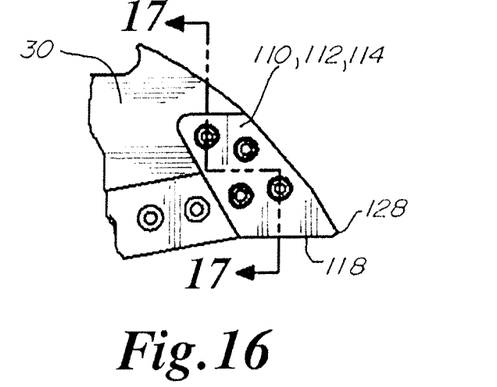
FIG. 16 is a broken away shear side elevational view of the distal end of the upper jaw with the second embodiment of the present invention installed thereon.
Figure 17:
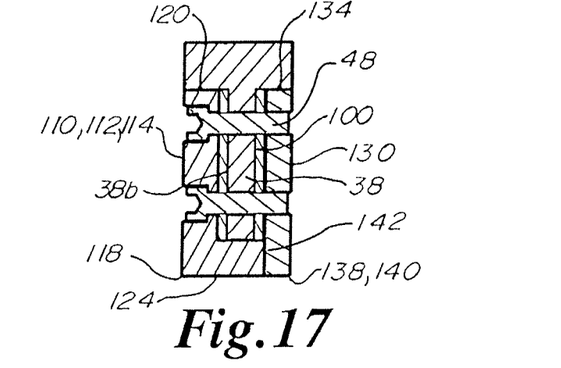
FIG. 17 is a cross sectional view taken along lines 17-17 of FIG. 10.

Prior art FIGS. 1 through 3 generally show the structure of a demolition shear. A prior art heavy duty demolition shear 10 has a lower jaw 12 and pivot 14. The lower jaw 14 has a shear blade side 16 with a shear blade 18, a guide blade side 20 with a distal shear blade 22 and a cross, tie or chin plate 24 with a cross blade 26 forming a recess 28 therebetween.

A movable upper jaw 30 is connected to the lower jaw 12 at pivot 14. A hydraulic cylinder or actuator (not shown) also is connected to the shear frame rearward of the lower jaw 12 and a rear portion of the upper jaw 30 The upper jaw 30 has a shear blade side 32 with a shear blade 34, a guide blade side 36 with a distal end shear tip or tang 38. The tang 38 has a front edge 38a, side faces 38b, top seat 38c, rear seat 38d and bottom seat 38e. Bolt holes or apertures 40 pass through the side faces 38b. Replaceable L-shaped shear tip sections 42 have a top vertical section 44 and a bottom horizontal section 46. Replaceable shear tip sections 42 are secured to tang 38 through the apertures 40 with bolts 48 or the like.

In operation, the upper jaw 30 passes into the recess 28. The tip sections 42 need to be periodically replaced as the shear tip becomes worn as it punches through material to be reduced and further shears along the distal shear blade 18, distal guide shear blade 22 and cross cutter blade 26. Also over time, the upper jaw distal end or tang 38 becomes worn as shown in exaggeration in FIG. 1A. The tang side faces 38b wear down as the tang 38 actually becomes thinner and the top vertical sections tend to move inward (arrow A) while the bottom horizontal sections move outward (arrow B). Also tang surfaces 38a, 38c, 38d and 38e can wear with continued use of the shear. Gaps 48 begin to appear between the tang 38 and the shear tip sections 42 This situation detrimentally causes the shear tip portions 42 to break as they strike in operation the distal lower shear blade 18, distal guide blade 22 and cross blade 26.

Total clamping force action between the shear tip or tang 38 and the shear tip sections 42 is also absolutely required for the shear tip and tang to work properly together and for the tang 38 to not wear out prematurely. When the tang 38 and shear tip sections lose complete and total clamping force between the shear tip tang 38 and the shear tip sections or pieces 42, the tang 38 must be cut off and replaced by welding with a new tang 38. It can be costly to replace these worn parts and such repair efforts require the shear 40 to be taken out of operation.

There is a need for a shear tip that encompasses or encapsulates most of the tang that is substantially one-piece with a side plate and is adjustable with one or more shims, to insure complete and total clamping force between the shear tang and the shear tip pieces and to minimize tang side face wear and assure proper alignment of the shear tip on the tang to avoid shear tip breakage.

SUMMARY OF THE INVENTION

An adjustable shimable indexable shear tip for a distal end tang of a heavy duty demolition shear having a upper movable shear jaw with a shear side and a guide side pivotally connected to a lower shear jaw with a shear blade side, a guide side, a distal tie plate and a recess therebetween. The tang has side faces with apertures therethrough, a top seat, a rear seat and a bottom seat. The adjustable shimable shear tip has a two-sided shear tip section with a sidewall and a bottom wall that is adapted to be seated on one of the side tang faces, the top seat, the rear seat and the bottom seat. The bottom wall is formed with the sidewall at a shear edge and is adapted to be seated on the tang bottom seat with a leading shear punching edge. A side plate is adapted to be seated on the other tang side face, the top seat, the rear seat with another shear edge along the bottom wall. The side plate has apertures therethrough alignable with the sidewall apertures and the tang apertures to secure the sidewall, lower wall and access plate to the tang. A shim or shims with matching apertures to the sidewall and the side plate are adapted to be insertable inside the sidewall and the side plate against the tang faces either after the faces have become worn or otherwise if the shear tip needs dimensional adjustments to fit the tang. An extending boss maybe on the lower inside face of the side plate as to index and interlock with a matching indexing slot on the distal face of the bottom wall.

A principal object and advantage of the present invention is that the two-sided shear tip section includes a shear blade side sidewall that is integral with the bottom wall lending significant integrity and strength to the shear tip as well as assuring a more exact fit about the tang.

Another object and advantage of the present invention is the many available sized shims for use against the tang faces as they become worn insure maximum clamping force of the shear tip and tang faces which is otherwise diminished as the tang faces wear.

Another object and advantage of the present shear tip invention is that the novel shims have not been used with upper jaw shear tips or tangs before. Shims are important as they increase the clamping power necessary as to not wear down the tang side surfaces and compensate for manufacturing irregularities, tolerances and other tang wear which is very common.

Another object and advantage of the present invention is the available shims for use against the tang faces as they become worn insure that the shear tip boss on the side plate and the indexing slot on the distal face of the bottom wall assure that the shear tip pieces are properly positioned and aligned with each other and the tang which otherwise may be subject to breakage by striking the shear blades of the lower jaw of the demolition shear.

DETAILED SPECIFICATION

The prior art demolition shear 10 and its parts that the present invention may be used with has been discussed above in the Background of the Invention. There are certainly other shear types that the present invention will work with if any other shear uses shear tips at their tang location.

Referring to FIGS. 4 through 8, the adjustable shear tip 60 of the present invention may be appreciated. The shear tip 60 generally includes its two-sided shear tip section 62 and is side plate 84 which fits over and is secured to upper jaw shear distal end or tang 38.

More particularly, the two-sided shear tip portion 62 has a sidewall 64 with an array of trapezoidal bolt apertures 66 therethrough. Sidewall 64 has a lower shearing edge 68, a top edge 70, a rear edge 72, and a bottom wall 74 with a curved section. The lower wall has a punching edge 78 and a guide side second shearing edge 80. It is to be understood that the adjustable shear tip 60 may have a mirror image construction of two-sided shear tip section 62. That is to say, a mirror image of tip section 62 could fit on the guide blade side 36 of the upper jaw 30.

The side plate 84 has an array of trapezoidal threaded apertures for bolts 48, a top edge 88, a rear edge 90, a bottom edge 92 with a curved portion 94. The bottom edge 92 with its curved portion 94 has a flush engagement at 96 with the top of the bottom wall 74 of the two-sided shear tip section 62.

Referring to FIGS. 8 through 11, Shims 100 have an array of trapezoidal apertures 102 that are alignable with apertures in two-sided shear tip section 112, tang 38 and side plate 130. Shims 100 have not been used with upper jaw shear tips or tangs before. Shims 100 are made from high quality sheet steel available in thicknesses starting with 0.001 of an inch graduating a few thousandth of an inch in thicknesses depending on tang 38 surfaces wear and manufacturing tolerances.

The assembly of the adjustable shear tip 60 onto an upper jaw 30 of a demolition shear 10 may now be understood. The upper jaw 30 has a shear blade side 32 with a shear blade 34, a guide blade side 36 and a distal end or tang 38. Tang 38 has a front edge 38a, side faces 38b, top seat 38c, rear seat 38d and a bottom seat 38e. A trapezoidal array of bolt holes or apertures 40 pass through the side faces 38b. Shims 100 with matching apertures 102 are optionally shown in position for assembly. Threaded bolts 48 secure the two-sided shear tip 62, shims 100 and side plate 84 about tang 38 as the shear tip 62 and side plate 84 rest and are supported in or on side faces 38b, rear seat 38d, bottom seat 38e and top seat 38c.

Importantly, the upper side of bottom wall 74 has a flush engagement with the bottom edge 92 of the side plate 84 so that the shear tip 60 is properly aligned and supported for punching and shearing action and to avoid breakage. Shims 100 assure this arrangement after the tang 38 becomes worn or due to manufacturing tolerances.

If the tang faces 38b become worn or the alignment of shear tip 60 and/or side plate 84 need corrections, one or more shims 100, or thicker shims 100, may be placed against tang side faces 38b to assure that the greatest clamping force is applied to the tang 38 by the shear tip 60.

FIGS. 12 through 17 show a second embodiment of the adjustable shear tip 110 with side plate 130. More particularly, the two-sided shear tip portion 112 has a sidewall 114 with a trapezoidal array of bolt apertures 116 therethrough. Sidewall 114 has a lower shearing edge 118, a top edge 120, a rear edge 122, and a bottom wall 124 with a curved section 126 and a distal edge or face 129. The lower or bottom wall 124 has a punching edge 128. It is to be understood that the adjustable shear tip 110 may have a mirror image construction of two-sided shear tip section 112. That is to say, a mirror image of tip section 112 could fit on the guide blade side 36 of the upper jaw 30.

The side plate 130 has a trapezoidal array of threaded apertures 132 for bolts 48, a top edge 134, a rear edge 136, a bottom edge 138 with a curved portion 94 and a second shearing edge 140. The bottom wall 124 has a flush engagement at 142 with the two-sided section 112 distal edge or face 129.

Again it is important that the distal edge or face 129 of bottom wall 124 have a flush engagement with the bottom edge or face 138 of the side plate 130 so that the shear tip 110 is properly aligned and supported for punching and shearing action and to avoid breakage. Shims 100 assure this arrangement after the tang 38 becomes worn or due to manufacturing tolerances.

The assembly of the adjustable shear tip 110 onto an upper jaw 30 of a demolition shear 10 may now be understood. The upper jaw 30 has a shear blade side 32 with a shear blade 34, a guide blade side 36 and a distal end or tang 38. Tang 38 has a front edge 38a, side faces 38b, top seat 38c, rear seat 38d and a bottom seat 38e. A trapezoidal array of bolt holes or apertures 40 pass through the side faces 38b. Shims 100 with matching apertures 102 are optionally shown in position for assembly. Threaded bolts 48 secure the two-sided shear tip section 112, shims 100 and side plate 130 about tang 38 as the two-sided shear tip section 112 and side plate 130 rest and are supported in or on side faces 38b, rear seat 38d, bottom seat 38e and top seat 38c.

If the tang faces 38b become worn, or the alignment of shear tip 110 and/or side plate 130 need corrections, one or more shims 100, or thicker shims 100, may be placed against tang side faces 38b may to assure that the greatest clamping force is applied to the tang 38 by the shear tip 110.

Figures 18, 19, 20:
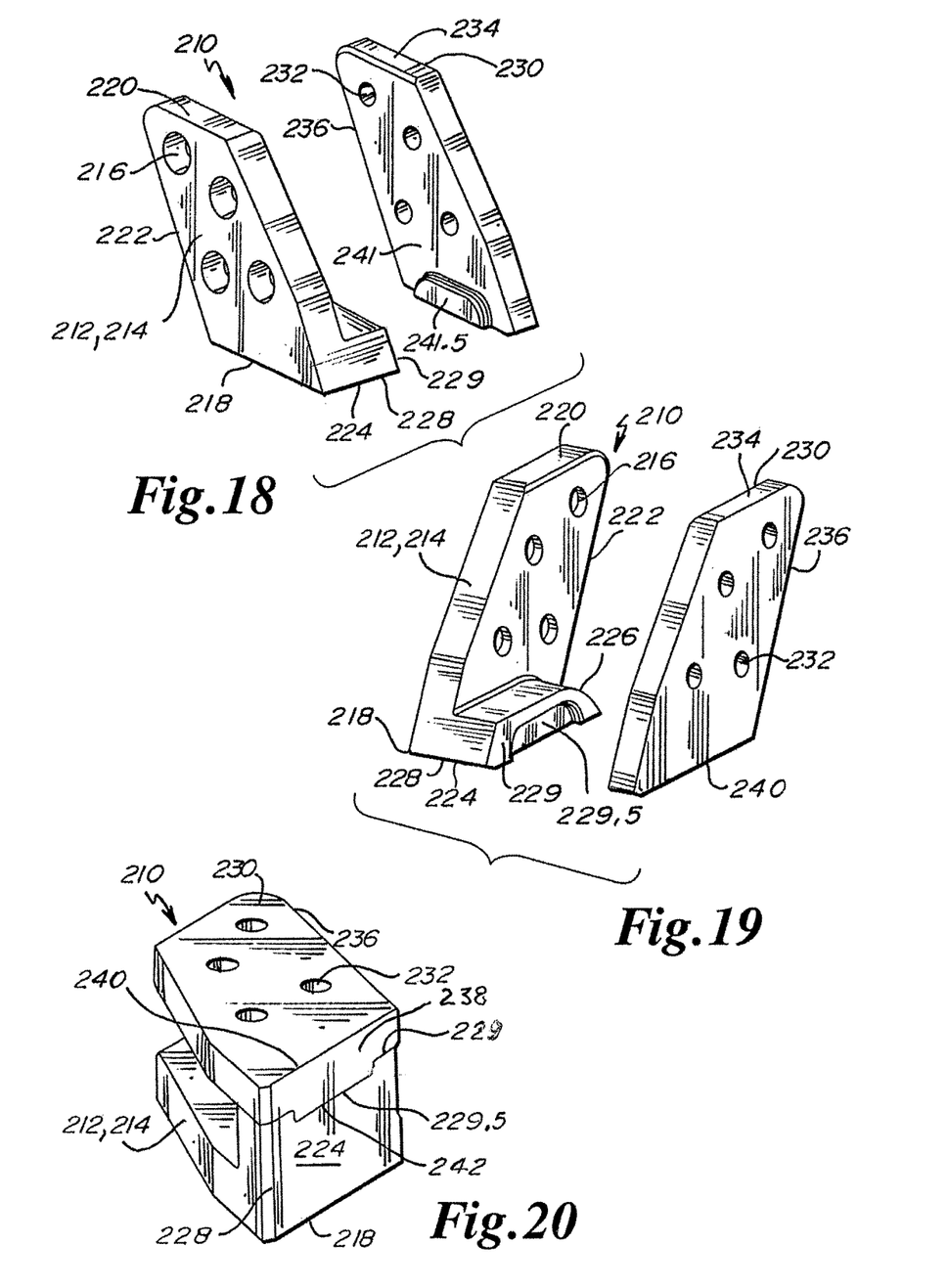
FIG. 18 is a front perspective view of a third embodiment of the adjustable shear tip of the present invention partially rotated outward for viewing of the indexing boss and slot.
FIG. 19 is a front elevational view of the third embodiment of the adjustable shear tip of the present invention ready for installation on the distal end of the upper jaw.
FIG. 20 is a bottom perspective view of the third embodiment of the adjustable shear tip of the present invention showing the boss indexed with the slot.

FIGS. 18 through 20 show a third embodiment of the adjustable shear tip 210 with side plate 230. More particularly, the two-sided shear tip portion 212 has a sidewall 214 with a trapezoidal array of bolt apertures 216 therethrough. Sidewall 214 has a lower shearing edge 218, a top edge 220, a rear edge 222, and a bottom wall 224 with a curved section 226 and a distal edge or face 229 with indexing slot or cut out 229.5 that is semi-oval in shape. The lower or bottom wall 224 has a punching edge 228. It is to be understood that the adjustable shear tip 210 may have a mirror image construction of two-sided shear tip section 212. That is to say, a mirror image of tip section 212 could fit on the guide blade side 36 of the upper jaw 30 as similarly shown in FIGS. 12 through 17.

The side plate 230 has a trapezoidal array of threaded apertures 232 for bolts 48, a top edge 234, a rear edge 236, a bottom edge 238 and a second shearing edge 240. An indexing boss 241.5 is provided on inner face 241. The bottom edge 238 has a flush engagement at 242 with the two-sided shear tip portion 212 distal edge or face 229.

Again it is important that the distal edge or face 229 of bottom wall 228 of the two-sided shear tip portion 212 have a flush engagement with face 241 of the side plate 230 so that the shear tip 210 is properly aligned and supported for punching and shearing action and to avoid breakage. The indexing boss 241.5 on inner face 241 on the side plate 230 and the slot or cut out 229.5 on the distal face 229 of the two-side shear tip portion 212 create an interlocking feature to assure this flush and properly aligned arrangement (FIG. 20) remains in place.

The assembly of the adjustable shear tip 210 onto an upper jaw 30 of a demolition shear 10 is the same as shown in FIGS. 12 through 17 as described above.

In operation, the adjustable shear tips 60, 110 or 210 with shims 100 are assuredly always in proper alignment with the shear tang 38 as the shear 10 punches and shears a workpiece as the upper jaw 30 passes by the lower jaw 12 and into recess. This proper alignment assures that upper jaw 30 comes out of recess 28 without striking any part of the lower jaw 12. Tang 38 wear and manufacturing tolerances can be compensated for with shims 100 which have not been used before in this arrangement.

The above embodiments are for illustrative purposes. Other shear structures may use the shear tip and shims of the present invention. The following claims define the true scope of this invention.

What is claimed:

1. An adjustable shimable indexable shear tip assembly for a distal end tang of a demolition shear having a upper movable shear jaw with a shear side and a guide side pivotally connected to a lower shear jaw with a shear blade side, a guide side, a distal tie plate and a recess therebetween, wherein the tang has side faces with apertures therethrough, a top seat, a rear seat and a bottom seat, the adjustable shear tip assembly comprising:
   (a) a two-sided shear tip portion, comprising:
      (i) a sidewall adapted to be seated on one of the side tang faces, the top seat and the rear seat with apertures therethrough with a lowermost portion having a first shearing edge;
      (ii) a bottom wall extending laterally from the lowermost portion of the sidewall having a leading second shearing edge and a distal face, the bottom wall adapted to be seated on the tang bottom seat;
   (b) a flat planar side plate with a lowermost portion having a third shearing edge adapted to be seated on the other tang side face, the top seat, the rear seat and the side plate having an inner face and apertures therethrough alignable with the sidewall and the tang apertures to secure the sidewall and side plate to the tang with bolts wherein the distal face of the bottom wall and a lower portion of the inner face of the side plate are in a touching flush arrangement with each other; and
   (c) an indexing interlocking slot on one of the side plate inner face or the distal face of the bottom face and a boss on the other of the side plate inner face or the distal face of the bottom wall.

2. The adjustable shear tip of claim 1, further comprising at least one shim with matching apertures to the sidewall and the side plate apertures adapted to be insertable inside the sidewall and the side plate against the tang faces and clampable thereto.

3. An adjustable shimable indexable shear tip assembly for a distal end tang of a demolition shear having a upper movable shear jaw with a shear side and a guide side pivotally connected to a lower shear jaw with a shear blade side, a guide side, a distal tie plate and a recess therebetween, wherein the tang has side faces with apertures therethrough, a top seat, a rear seat and a bottom seat, the adjustable shear tip assembly comprising:
 (a) a two-sided shear tip portion, comprising:
  (i) a sidewall adapted for the shear side of the upper jaw and to be seated on one of the side tang faces, the top seat and the rear seat with apertures therethrough with a lowermost portion having a first shearing edge;
  (ii) a bottom wall extending laterally from the lowermost portion of the sidewall having a leading second shearing edge and a distal face, the bottom wall adapted to be seated on the tang bottom;
 (b) a flat planar side plate with a lowermost portion having a third shearing edge adapted for the guide side of the upper jaw and to be seated on the other tang side face, the top seat, the rear seat and the side plate having an inner face and apertures therethrough alignable with the sidewall and the tang apertures to secure the sidewall and access plate to the tang with bolts, and;
 (c) an indexing interlocking slot and a boss, the boss being on one of the inner face of the side plate inner face or on the distal face of the bottom wall and the slot being on the other of the side of the side plate inner face or the distal face of the bottom wall, wherein the distal face of the bottom wall and a lower portion of the inner face of the side plate along with the indexing interlocking slot and the boss are in a touching flush arrangement with each other.

4. The adjustable shear tip of claim 3, further comprising at least one shim made of sheet steel.

5. An adjustable shimable indexable shear tip assembly for a distal end tang of a demolition shear having a upper movable shear jaw with a shear side pivotally connected to a lower shear jaw with a shear blade side, wherein the tang has side faces with apertures therethrough, a top seat, a rear seat and a bottom seat, the adjustable shear tip assembly comprising:
 (a) a two sided shear tip portion, comprising:
  (i) a sidewall adapted to be seated on one of the side tang faces, the top seat and the rear seat with apertures therethrough with a lowermost portion having a first shearing edge;
  (ii) a bottom wall extending laterally from the lowermost portion of the side wall having a leading second shearing edge and a distal face, the bottom wall adapted to be seated on the tang bottom seat;
 (b) a flat planar side plate with a lowermost portion having a third shearing edge adapted to be seated on the other tang side face, the top seat and the rear seat and the side plate having an inner face with apertures therethrough alignable with the sidewall and the tang apertures to secure the sidewall and the side plate to the tang with bolts, wherein the distal face of the bottom wall and a lower portion of the inner face of the side plate are in touching flush arrangement with each other;
 (c) an indexing interlocking slot on one of the side plate inner face or the distal face of the bottom wall and a boss on the other of the side plate inner face or the distal face of the bottom wall; and
 (d) at least one shim made of steel with matching apertures to the sidewall and the side plate apertures adapted to be insertable inside the sidewall or the side plate against one of the tang faces and clampable thereto.

6. An adjustable shimable indexable shear tip assembly for a distal end tang of a demolition shear having a upper movable shear jaw with a shear side pivotally connected to a lower shear jaw with a shear blade side, wherein the tang has side faces with apertures therethrough, a top seat, a rear seat and a bottom seat, the adjustable shear tip assembly comprising:
 (a) a two-sided shear tip portion, comprising:
  (i) a sidewall adapted to be seated on one of the side tang faces, the top seat and the rear seat with apertures therethrough with a lowermost portion having a first shearing edge;
  (ii) a bottom wall extending laterally form the lowermost portion of the sidewall having a leading second shearing edge and distal face, the bottom wall adapted to be seated on the tang bottom seat; and
 (b) a flat planar side plate with a lowermost portion having a third shearing edge and an inner face adapted to be seated on the other tang side face, the top seat, the rear seat and the sidewall, wherein the side plate having apertures therethrough alignable with the sidewall and the tang apertures to secure the sidewall and side plate to the tang with bolts, wherein the distal face of the bottom wall and a lower portion of the inner face of the side plate are in touching flush arrangement with each other;
 (c) an indexing interlocking slot on one of the side plate inner face or the distal face of the bottom wall and a boss on the other of the side plate inner face or the distal face of the bottom wall; and
 (d) at least one shim with matching apertures to the sidewall and the side plate apertures adapted to be insertable inside the sidewall or the side plate against one of the tang faces and clampable.

* * * * *